United States Patent
Robertson

[15] 3,658,279
[45] Apr. 25, 1972

[54] INTEGRATED PROPULSION SYSTEM

[72] Inventor: Arthur J. Robertson, Marietta, Ga.

[73] Assignee: Lockheed Aircraft Corporation, Burbank, Calif.

[22] Filed: Apr. 21, 1970

[21] Appl. No.: 30,457

[52] U.S. Cl. .................................244/53 R, 244/42 CC
[51] Int. Cl. ...........................B64d 27/00, B64c 3/50
[58] Field of Search...............244/53, 55, 52, 42 R, 42 C, 244/42 CB, 42 CC; 239/265.25, 265.27, 265.29

[56] References Cited

UNITED STATES PATENTS

| | | | |
|---|---|---|---|
| 3,029,044 | 4/1962 | Childress | 244/42 CC X |
| 2,928,627 | 3/1960 | Johnson | 244/42 CC X |
| 2,951,660 | 9/1960 | Giliberty | 244/52 |
| 3,284,029 | 11/1966 | Kaminski et al. | 244/52 |
| 2,734,698 | 2/1956 | Straayer | 244/52 X |
| 2,961,193 | 11/1960 | Orford | 244/42 CC X |
| 2,891,740 | 6/1959 | Campbell | 244/42 CC X |
| 3,057,150 | 10/1962 | Horgan | 239/265.29 X |

Primary Examiner—Trygve M. Blix
Attorney—John J. Sullivan and George C. Sullivan

[57] ABSTRACT

A thrust vectoring, thrust reversing and lift augmentation system is provided for jet aircraft in a compact package to optimize the several controlled flight regimes of the aircraft. Thus, the pilot can selectively direct and control the exhaust gases of each engine to give maximum forward thrust, boundary layer control and/or jet flap lift augmentation or he can select some combination of vectored thrust with lift augmentation. Additionally, when desired a thrust reversing position can be selected to minimize ground roll after landing of the aircraft.

8 Claims, 4 Drawing Figures

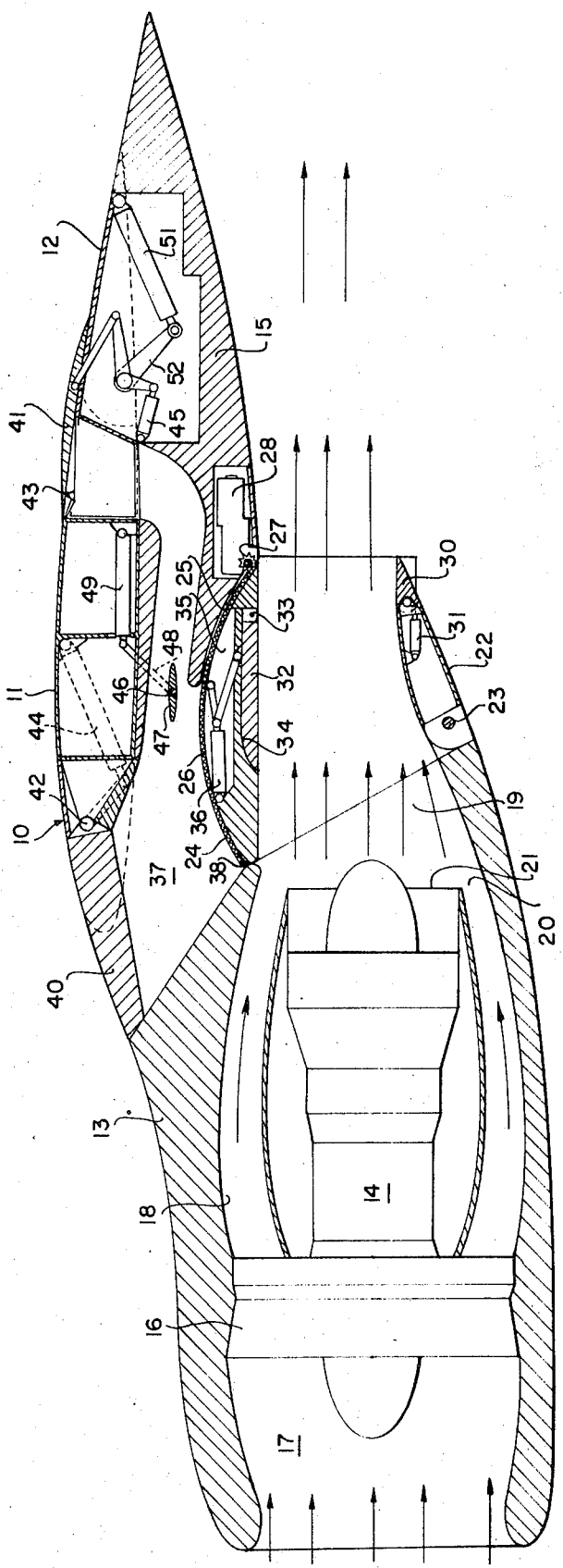
FIG_1

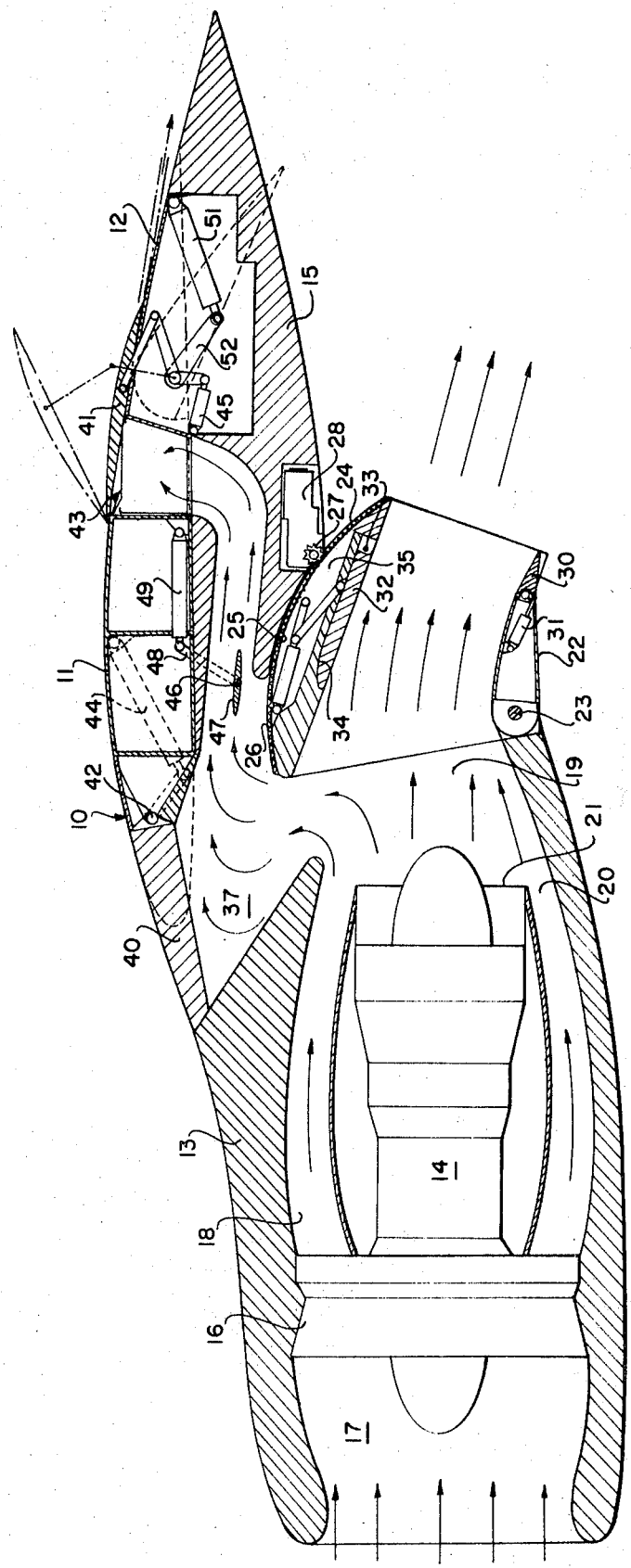
FIG_2
INVENTOR.
ARTHUR J. ROBERTSON

PATENTED APR 25 1972
3,658,279
SHEET 3 OF 4
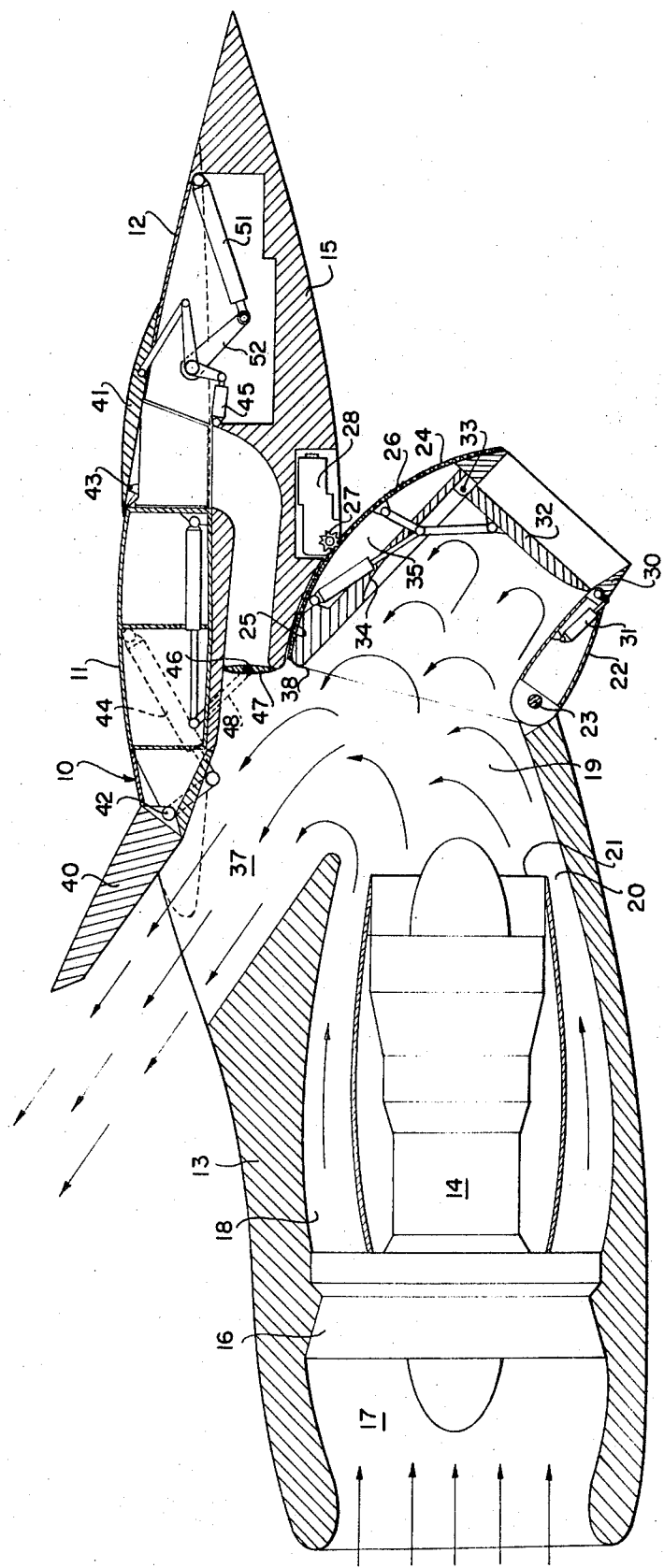
FIG_3
INVENTOR.
ARTHUR J. ROBERTSON
BY George C. Sullivan, agent
John J. Sullivan
Attorney

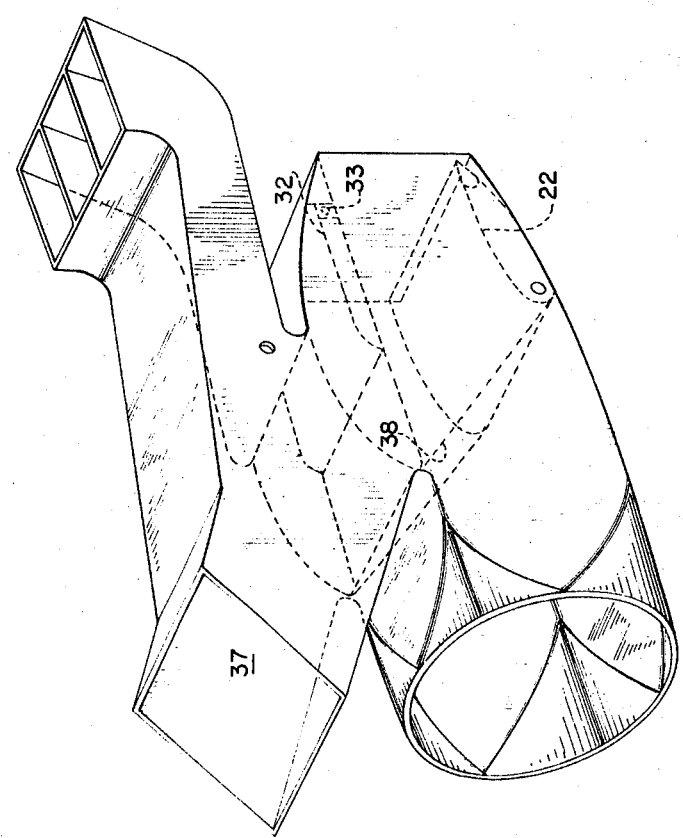
FIG_4

INTEGRATED PROPULSION SYSTEM

This invention relates to propulsion systems of the type employed in aircraft, and more particularly to improvements in high lift propulsion systems whereby thrust vectoring and thrust reversing is incorporated and integrated into such a system so as to be compatible with the cruise of level flight operation thereof and thereby produce a composite engine of maximum efficiency and compactness.

In an effort to get maximum return from propulsion systems in STOL and VTOL aircraft integrated systems have evolved which propose to use a common engine to produce the thrust during both the horizontal and vertical flight modes of the aircraft. In substance, this can only be accomplished in one of two ways: (1) by deflecting or turning the thrust to produce the desired directions, or (2) rotating or turning the engines. Generally speaking in smaller aircraft on the order of up to about 60,000 pounds vertical takeoff weight, the second method has been used, while in the larger aircraft on the order of about 60,000 pounds and up the first method has been preferred, since in this case the means necessary to effect rotation of the engine together with the structural requirements become prohibitive. Thus, the integrated propulsion system attempts in effect to exact the benefits of both approaches and thereby avoid the penalty of drag and dead weight of a separate lift engine or engines during the horizontal or cruise regime of the aircraft.

In conjunction with the foregoing, it is desirable to provide for reverse thrust to minimize the landing distance or ground roll of the aircraft after touchdown. As pointed out in the copending application of Searle and Tatom, Ser. No. 23,826 filed Mar. 30, 1970, reingestion of the exhaust efflux has been a problem with reverse thrusters, especially in multi-engine aircraft. An efficient propulsion system must, therefore, also take into account these important considerations.

The present invention proposes to optimize the foregoing requirements of vectoring and reverse jet thrust together with high lift capabilities into an integrated, single, compact, engine nacelle. At the same time, these three distinct components are so related as to produce a relatively uncomplicated and reliable system.

More specifically, the instant invention contemplates an integrated propulsion system in which there is provided a common exhaust distribution chamber of all three components. Thus, a plenum develops as thrust is vectored and transition occurs from the cruise regime to the high left regime from which a transition to reverse thrust operation is readily effected. From this plenum, engine exhaust efflux can be controlled and directed out the vector nozzle and/or to a pressurized boundary layer control duct or jet flap and also alternatively out the thrust reverser. This central flow distribution is the key to the advantages to be obtained through the integrated system herein proposed.

With the above and other objects in view as will be apparent, this invention consists in the construction, combination and arrangement of parts all as hereinafter more fully described, claimed and illustrated in the accompanying drawings wherein:

FIG. 1 is a transverse section taken through a major aircraft component viz a wing or the like, as modified to incorporate a nacelle housing the integrated propulsion system as contemplated by this invention to show the basic duct there of which includes a plenum area and several outlets corresponding to cruise, vectoring, supplemental lift, and reverse thrust, together with valving devices and apparatus associated with each to control the selected direction of the engine exhaust efflux therefrom, the location of the several parts being disposed in a position corresponding to the normal cruise regime of the aircraft;

FIG. 2 is a similar section with the position of the parts changed corresponding to a partial thrust vectoring condition whereby relatively small portions of the exhaust gases are employed to fill the plenum area adjacent the reverse thrust and supplemental lift outlets;

FIG. 3 is a similar section showing the maximum position of the thrust vectoring nozzle and the associated valve mechanism closed to direct all of the engine exhaust into and through the reverse thrust outlet, the reverse thrust door being opened and the supplemental lift outlet being closed; and FIG. 4 is a schematic, isometric view depicting the basic ducting pattern or arrangement which defines and includes the plenum and associated channels communicating with the thrust vectoring nozzle, the supplemental lift and reverse thrust outlet, the thrust vectoring nozzle being shown in broken lines in the position corresponding to that of FIG. 1.

Referring more particularly to the drawings, 10 designates a horizontal lift surface or wing of an aircraft which comprises generally a relatively fixed forward section 11 and a relatively movable aft section or flap 12 hinged thereto and constituting a trailing edge. The present invention proposes to mount to this wing structure an underslung engine nacelle 13 housing a turbojet or turbofan engine 14. To this end, a pylon 15 is employed which constitutes an integral part, in effect, of the nacelle 13 and is mounted or otherwise immovably secured in any conventional manner to the wing 10 in the desired position.

The engine 14 is mounted axially within the nacelle and includes a fan 16 at its forward end with a common inlet 17 to the fan 16 and engine 14 whereby air simultaneously passes into the engine 14 and through the fan 16 into an annular fan duct 18 surrounding the engine 14. The exhaust efflux of the fan 16 and engine 14 is emptied into a common plenum 19 in communication with the fan and engine nozzles 20 and 21 respectively.

Mounted within the plenum 19 is rotary nozzle 22 to permit thrust vectoring of the exhaust from the engine 14. This thrust vectoring nozzle 22 is rotatably secured to the nacelle 13 within the wall or cowl thereof at the lower aft end thereof as at 23 and formed or otherwise provided with an arcuate surface 24 at and along its upper end for coaction with a complemental surface 25 forming structure of the pylon 15.

An engagement is provided between the coacting surfaces 24 and 25 which, for example may be a rack 26 on surface 24 cooperating with a pinion 27 carried by the pylon 15. This pinion 27 is reversibly driven by a motor 28 appropriately mounted in any conventional manner within the pylon 15 so that rotation of the pinion 27 in either direction by such motor 28 serves to rotate the thrust vectoring nozzle 22 about its pivot 23. In this way, the direction of the thrust is made to be variable between the horizontal position stated as 0° (FIG. 1) and some angular position on the order of 70° downward with respect to the horizontal (FIG. 3).

At its aft end the nozzle 22 is provided with a pivotable tab 30 to vary the effective cross sectional area thereof principally when the nozzle 22 is in an angular or vectored position or in order to recover flow-turning losses. Appropriate actuating means 31 is associated with this tab 30 for its movement.

Internally the nozzle 22 is formed by surfaces constituting an extension or continuation surface of the plenum wall when the nozzle 22 is in the horizontal or cruise position as illustrated in FIG. 1. Within the nozzle structure is a blocker door 32 mounted on a hinge 33 adjacent the aft end of the nozzle 22. To this end a recess 34 is provided in the nozzle wall structure to accommodate the door 32 during the cruise regime of the aircraft when the surface of the door 32 is disposed in the plane of the adjacent internal nozzle surface.

Also mounted within the nozzle structure in a space 35 provided therefor is an actuator 36 the free end of which is connected to the blocker door 32. The door 32 is thereby rotated on its hinge 33 to and from extreme positions totally within the recess 34 (FIGS. 1 and 2) and projecting laterally therefrom so as to completely obstruct the transverse passage defined by the nozzle 22 (FIG. 3).

The pylon 15 is centrally opened to define a duct 37 which extends from adjacent the leading edge of the wing 10 to adjacent the aft portion of the relatively fixed wing section 11 proximate the hinge line between said wing section 11 and flap 12. An opening 38 is provided in the pylon 15 for communication with the plenum 19. When the thrust vectoring nozzle 22 is located in the 0° or horizontal position it overlies and closes this opening 38. As the thrust vectoring nozzle 22 is deflected, however, upon operation of the pinion 27, the opening 38 is uncovered thereby and communication is established between the plenum 19 and the pylon duct 37, as illustrated in FIG. 2. The size of this opening 38 continues to increase with the further deflection of the nozzle 22 until the nozzle 22 reaches its extreme downward position as illustrated in FIG. 3.

Associated with the pylon duct 37 at each of its ends is a door 40 and 41. Each such door 40 and 41 is mounted through a conventional hinge connection 42 and 43 respectively to the associated fixed structure of the wing 10 for rotation into the airstream by appropriate power actuating means 44 and 45 respectively to open the duct end. Thus when the thrust vectoring nozzle 22 is deflected out of its 0° or horizontal position and the exhaust efflux from the engine 14 is allowed to pass into the duct 37, it may be vented through the duct 37 at either end.

It is contemplated that during the initial rotation of the thrust vectoring nozzle 22, i.e., between for example 0° and about 40°, the door 41 may be opened whereby some of the exhaust from the fan 16 and engine 14 is discharged over the aft portion of the wing or flap 12 to effect an additional lift which supplements that obtained by the exhaust discharge out of the vectored nozzle 22. As the thrust vectoring nozzle 22 is further rotated to its extreme angular position of about 70° off horizontal, the door 40 may be opened by operation of its actuator 44 to effect reverse thrust. At this time, of course, the blocker door 32 in the thrust vectoring nozzle 22 will have been located in the closed position, as illustrated in FIG. 3. Also, the door 41 is closed.

If desired, the part of the duct 37 proximate the door 41 may be closed by a suitable blocker door rotatably mounted therein. To this end, medially of its length the duct 37 is provided with a fixed pivot 46 carrying the door element 47. At its end, the pivot 46 is secured to a link 48 the other end of which is pivotally connected to an actuator 49 appropriately mounted to fixed structure of the pylon 15 or wing 11 as may be convenient. Thus, as the actuator 49 is extended and contracted the door element 47 is opened and closed accordingly to either allow or obstruct communication between the plenum 19 and the aft portion of the pylon duct 37.

Referring more specifically to FIG. 4 the general configuration of the nacelle 13 and pylon 15 defining the inlet 17, plenum 19 and duct 37 is shown. This constitutes the preferred ducting arrangement whereby to effect the operation of the composite engine herein contemplated and to accommodate the related movable parts, viz the nozzle 22 and the several doors 32, 40, 41 and 47. Thus the structure defining this ducting is made to transition from a generally circular form at the inlet 17 to a generally rectangular form in the area of the plenum 19 and duct 37. In order to insure maintenance of the rectangular duct form during operation structural ties or ribs, usually referred to as splitters, 50 may be provided within the ducts, as appropriate.

In view of the foregoing construction and arrangement, it is apparent that the several modes of operation of the aircraft may be readily effected. Thus, in the normal level flight or cruise regime the thrust vectoring nozzle 22 is located in the horizontal position (FIG. 1) and the doors 40 and 41 associated with the ends of the pylon duct 37 are closed. In this position, all of the exhaust efflux from the fan and engine nozzles 20 and 21 is discharged directly aft through the nozzle 22 to give maximum thrust to the aircraft.

When the high lift condition is desired, the thrust vectoring nozzle 22 is rotated downwardly to effect an upward component of force on the aircraft. At this time the trailing edge or flap 12 is deflected by means of and through an actuator 51 and horn 52 associated therewith in conventional manner. It is possible to supplement this lift by operation of the jet blowing effect over the trailing edge 12 of the aircraft wing 10 by opening the door 41, since the nozzle 22 has rotated to a point where it uncovers the pylon duct opening 38 and part of the exhaust efflux from the nozzles 20 and 21 passes through and ultimate discharges over the aft trailing edge 12 of the wing 10.

In the reverse thrust condition which is employed during landing of the aircraft and at a time following the high lift condition, the thrust vectoring nozzle 22 is deflected to its extreme position (FIG. 3). At this time, the door 40 is opened, doors 41 and 47 associated with the duct 37 and the blocker door 32 in the nozzle 22 are all closed by operation of their respective actuators 44, 45, 49 and 36. All of the exhaust efflux from the engine 14 is thereby deflected through the forward opening of the pylon duct 37. The angle of this discharge, it is noted, is generally away from the plane of the air entering the inlet 17 and into the airstream where it is swept over the upper surface of the airplane wing 10. This has all the advantages as set forth in the copending Searle et al. Application Ser. No. 23,826 referred to above. Essentially these advantages are: the elimination of the possibility of reingestion of the exhaust efflux into the engine 14; and also an asymmetric discharge of the exhaust reverse thrust in a substantially vertical and forward direction to produce a downward component on the landing gear elements of the aircraft to further shorten the ground roll of the airplane.

Moreover, as contemplated, all of the foregoing advantages are accomplished by means of and through a compact unitary propulsion system which lends itself to packaging in an engine nacelle for mounting under an aircraft wing as is presently done.

While the details of construction and operation are set forth in the form presently felt to be the most preferred, it is to be understood that many variations may be made within the reasonably expected scope of the invention.

What is claimed is:

1. An integrated propulsion system for aircraft comprising a thrust producing engine, a pylon connecting said engine to the underside of a wing of the aircraft, a plenum to receive all of the exhaust efflux from said engine, a thrust vectoring control valve associated with said plenum and including a nozzle for the ejection of said exhaust therefrom at selected angles relative to horizontal, a duct located within said pylon and disposed generally parallel to the longitudinal axis of said engine with the ends thereof located proximate the respective forward and aft ends of said wing, an opening in said duct for communication with said plenum, a closure associated with said duct opening and each end of said duct and with said thrust vectoring nozzle and internally of said duct medially of its ends, and means for selectively opening each of said closures.

2. The propulsion system of claim 1 wherein said wing includes a relatively fixed forward section and a relatively movable aft section hinged thereto, and said duct end proximate the aft wing end is adjacent the hinge aforesaid.

3. The propulsion system of claim 1 wherein the selected angles aforesaid fall within the range of about 0° and 70° downwardly.

4. The propulsion system of claim 1 wherein the closures associated with said forward and aft duct ends serve to extend, in effect, the length of said duct when disposed in the open position.

5. The propulsion system of claim 1 including recess means in the wall of said thrust vectoring nozzle substantially conforming in size and shape to the closure associated therewith adapted to receive said closure when disposed in the open position whereby a surface of said closure forms a smooth and uninterrupted internal surface of said nozzle.

6. The propulsion system of claim 1 wherein said engine is housed within a nacelle and said nacelle includes a generally circular inlet to said engine and defines an exhaust duct from said engine of generally rectangular configuration in cross section, and said plenum is defined by walls that conform to said exhaust duct.

7. The propulsion system of claim 6 wherein said pylon duct is generally rectangular in cross section.

8. The propulsion system of claim 7 including at least one longitudinal rib internally of said pylon duct medially of the defining walls thereof serving as a structural support to maintain the rectangular shape aforesaid.

* * * * *